(12) United States Patent
Novelli et al.

(10) Patent No.: US 6,915,176 B2
(45) Date of Patent: Jul. 5, 2005

(54) MUSIC MARKING SYSTEM

(75) Inventors: Joseph Novelli, Oakland, NJ (US); Shai A. Laronne, Montville, NJ (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 342 days.

(21) Appl. No.: 10/143,271

(22) Filed: May 10, 2002

(65) Prior Publication Data

US 2003/0144918 A1 Jul. 31, 2003

Related U.S. Application Data

(60) Provisional application No. 60/353,909, filed on Jan. 31, 2002.

(51) Int. Cl.[7] ............................................. G06F 19/00
(52) U.S. Cl. ........................ 700/94; 700/88; 709/228; 710/8; 705/51
(58) Field of Search .............................. 700/94, 95, 88, 700/58; 705/26–29, 51; 395/200.47; 709/228, 203–206, 217–218, 223, 231, 245; 710/8, 10

(56) References Cited

U.S. PATENT DOCUMENTS

| | | | | |
|---|---|---|---|---|
| 5,860,068 A | * | 1/1999 | Cook ........................... | 705/26 |
| 5,918,213 A | * | 6/1999 | Bernard et al. ............... | 705/26 |
| 5,974,004 A | * | 10/1999 | Dockes et al. ............... | 345/727 |
| 6,032,130 A | * | 2/2000 | Alloul et al. ................. | 705/27 |
| 6,735,628 B2 | * | 5/2004 | Eyal ............................ | 709/223 |
| 2004/0199772 A1 | * | 10/2004 | Kwan ......................... | 713/176 |

OTHER PUBLICATIONS

U.S. Appl. No. 09/401,103 Deguchi.
U.S. Appl. No. 09/126,007.
"Sony Writes Swan Song For Radio Service", Ian Fried, CNET News.com, Sep. 5, 2001—printed from Internet.
"Sony Device Bookmarks Music Heard on Radio", Ian Fried, CNET News.com, Jun 9, 2000—printed from Internet.
"Bookmark your Radio", XENOTE Internet page, 1999–2000 Xenote.
Internet catalog page for Sony EMK–01–E–Marker, Electronics E mall. Undated, printed Feb. 19, 2002.
Internet catalog page for Sony EMK–01 E–Marker, Log2Shop.com, Undated, Printed Feb. 19, 2000.

* cited by examiner

*Primary Examiner*—Kidest Bahta
(74) *Attorney, Agent, or Firm*—Miller Patent Services; Jerry A. Miller (57) ABSTRACT

A method and apparatus that permits a user to electronically make a notation of a recorded music selection that he or she would like to take a later action on. Such later actions might include purchase actions or information gathering actions as well as other actions. The user actuates a button on a portable music player that plays music stored on a removable storage medium (e.g., a minidisc) and the music player stores identifying information that identifies the currently playing track of music. By connection of the music player to a personal computer, the user can then download the marked tracks to the personal computer and carry out actions over the Internet with service providers to complete transactions or queries.

70 Claims, 9 Drawing Sheets

File  Preferences  Help

[Submit]  [✗ Delete]

CURRENT MARKING LIST

| | | | | Action | | | |
|---|---|---|---|---|---|---|---|
| | | | | Get | Buy | Find | |
| Song | Artist | Album | | Info | CD | EMD | |
| Here Comes The Sun | The Beatles | Beatles One | ▶ | Info ✓ | CD ☐ | EMD ✓ | |
| Jumping Jack Flash | The Rolling Stones | Sticky Fingers | ▶ | Info ✓ | CD ✓ | EMD ☐ | |
| Brown Eyed Girl | Van Morrison | Moondance | ▶ | Info ☐ | CD ✓ | EMD ☐ | |
| Lay Down Sally | Eric Clapton | Slow Hand | ▶ | Info ✓ | CD ☐ | EMD ☐ | |
| Been Caught Stealing | Jane's Addiction | Kettle Whistle | ▶ | Info ☐ | CD ✓ | EMD ✓ | |
| Ramblin' Man | Allman Brothers | Ramblin' Man | ▶ | Info ✓ | CD ☐ | EMD ☐ | |

PREVIOUSLY IDENTIFIED MARKS

| MARK | MDID | TRACK # | TITLE | ACTION TAKEN |
|---|---|---|---|---|
| 1 | 15437 | 3 | Untitled | Info |
| 2 | 45438 | 6 | Rock Hit | Info |
| 3 | 45438 | 9 | Here Comes The Sun | CD |
| 4 | 26779 | 2 | Untitled | CD |
| 5 | 16570 | 7 | Untitled | --- |
| 6 | 86737 | 1 | Rolling Stones | --- |
| 7 | 48859 | 4 | Clapton Song | Info, EMD |
| 8 | 33483 | 7 | Rambling Man | Info CD |

MD CONNECTED
Number of Marks = 8

MUSIC MARKING SYSTEM

CROSS REFERENCE TO RELATED DOCUMENTS

This application is related to and claims priority benefit of U.S. Provisional patent application Ser. No. 60/353,909 filed Jan. 31, 2002 to Joseph Novelli, et al., entitled MiniDisc Music Marking System "Music Marker", which is hereby incorporated herein by reference.

FIELD OF THE INVENTION

This invention relates generally to the field of recorded audio or other content. More particularly, in certain embodiments, this invention relates to methods and apparatus for enhancing a user's experience in enjoying recorded music by permitting the user to make a notation of an audio track that a user wishes to reference at a later time in order to carry out some specific action related thereto.

BACKGROUND OF THE INVENTION

Traditionally, a user's experience with audio products, and perhaps particularly with portable audio products, has been limited to a passive experience. For example, current personal portable audio products such as Sony Corporation's Walkman® series products do not allow the user to interact with their music. Music is simply played back from the portable music device and the user passively listens to the playback.

Often, a user's interest in a particular song or artist will peek at the moment they are listening to that certain song or artist. For example, during playback of a certain song from a certain artist, the user may have interest in purchasing an earlier album from that artist or an album from a similar artist. Other examples of desired interactivity may be interest in learning when the artist will be coming to their area for a concert or learning when a new album will be released, or interest in similar music, or interest in purchasing artist merchandise or exchange information about the artist or song samples with a friend. There are numerous examples where a user's interactive interest in the music peaks during playback, but this interest will most likely subside shortly after this time and may be forgotten altogether. Also, with portable music devices, playback will often take place in remote locations (away from the home, office or computer). Thus, a user's interest may be lost any time between the moment of music playback (moment of interest) and the moment the user returns to their PC (a convenient place to facilitate the interest via the Internet).

SUMMARY OF THE INVENTION

The present invention relates generally to a recorded music marking system and methods therefor. Objects, advantages and features of the invention will become apparent to those skilled in the art upon consideration of the following detailed description of the invention.

In one embodiment consistent with certain aspects of the present invention, a method and apparatus permits a user to electronically make a notation of a recorded music selection that he or she would like to take a later action on. Such later actions might include purchase actions or information gathering actions as well as other actions. The user actuates a button on a portable music player and the music player stores identifying information that identifies the currently playing track of music. By connection of the music player to a personal computer, the user can then transfer the identified information to the personal computer and carry out actions over the Internet with service providers to complete transactions or queries.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Recently, the personal computer has become a centerpiece of equipment for audio entertainment. Many users frequently save music, often in compressed form, for playback on a portable playback device. Many such devices are currently available and can often store hundreds of music selections in a very small portable device making for a very convenient playback experience for the user. However, heretofore, there has been no convenient method for storing a user's interest (with the artist/song) at that moment of playback that can be later retrieved and processed according to the user's wish using a appropriate apparatus such as a PC.

Figure 1:
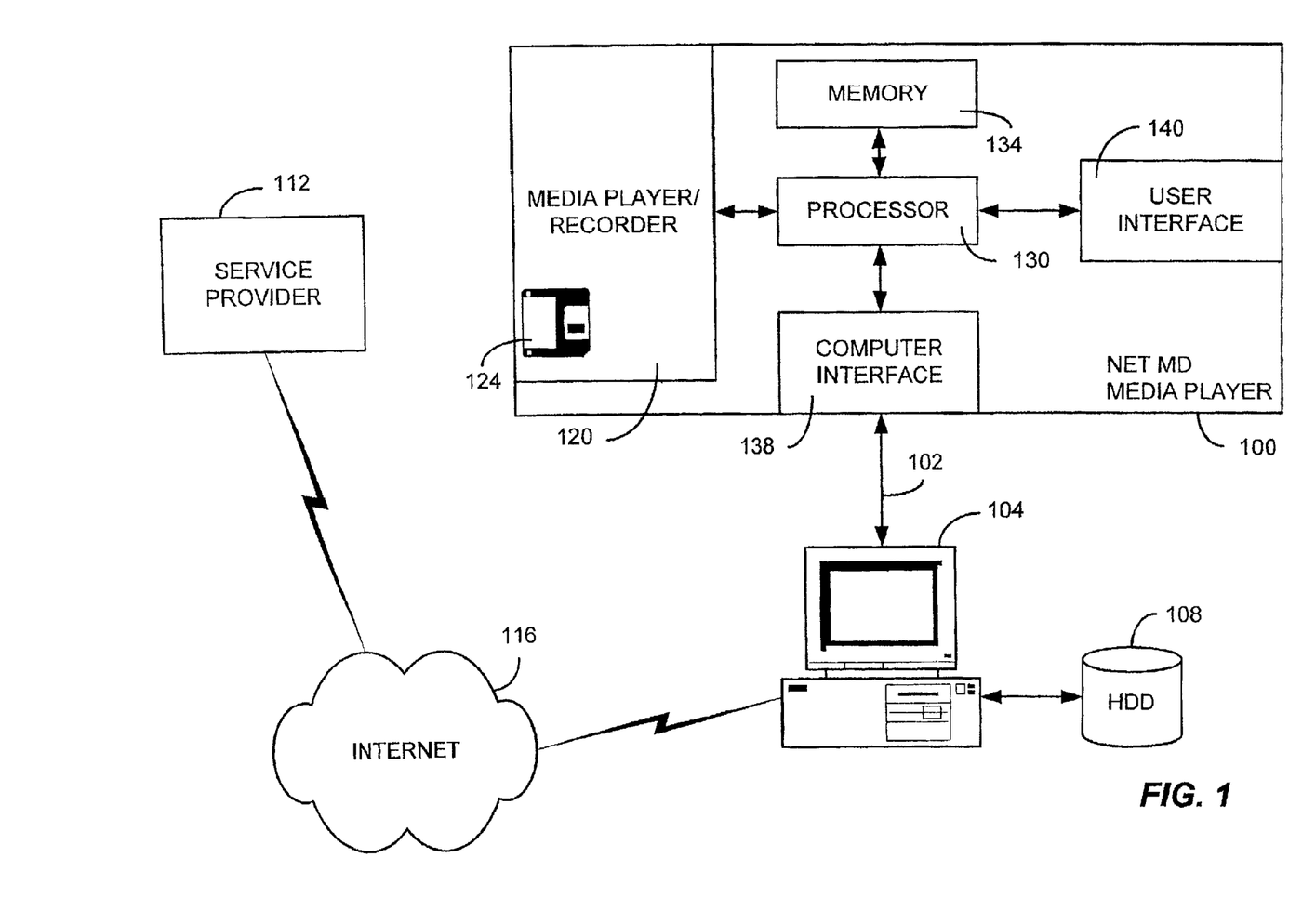
FIG. 1 is a block diagram of a music player device consistent within certain embodiments of the present invention.

Turning now to FIG. 1, such a playback device or media player implementing an embodiment of the present invention is illustrated broadly as 100. The playback device 100 is connected, e.g., via a universal serial bus (USB), IEEE 1394 bus or other appropriate connection, 102 to a personal computer 104. This personal computer 104 includes an associated (usually internal) hard disc drive (HDD) 108. The personal computer 104 may also be conveniently connected to various service providers such as 112 via the Internet 116. Service providers 112 provide content, information relating to content or permit users to purchase items related to the content. This connection may be via a high speed connection or by a dial-up connection using conventional telephone lines. The user may use this connection to explore the Internet and also to obtain music for music playback device 100 via various mechanisms.

One exemplary playback device 100 consistent with certain embodiments of the present invention, the playback device 100 may also be used to record to the music storage media. In the example illustrated, the playback device may be, for example, a minidisc™ (MD) player/recorder such as those consistent with the commercially available NetMD™ series product line from Sony Corporation. In the embodiment illustrated, the playback device incorporates an MD player/ recorder 100 that receives MD discs 124 as the recording media. Operation of the player 100 of the current exemplary embodiment is controlled by an internal processor 130, such as a microcomputer or specialized controller circuit. The processor 130 has associated internal or external memory 134 which is preferably persistent memory such as battery backed up random access memory (RAM), flash memory or other suitable electronic memory. The processor 130 communicates with a computer interface 138 such as a USB interface to provide communication with the PC 104. The user interacts with the player device 100 using any suitable user interface 140 which may have various buttons and other controls suitable for input of user commands such as play, stop, pause, etc.

In accordance with certain embodiments of the present invention, the user is able to take advantage of a feature programmed into the processor 130 and PC 104 that is referred to herein as "Music Marker". This feature provides a solution for storing a reminder of a user's interest in a particular music selection, artist, etc. at the moment of playback. The Music Marker feature also provides the user with the ability to later retrieve the reminder and facilitates fulfilling a user's desire for information or other action using a request carried out via the Internet. Those skilled in the art will appreciate that the Music Marker feature can be built into any digital music player or player/recorder containing some form of memory storage, and removable media. The MD player/recorder of the current example is intended to be illustrative of one exemplary embodiment of a minidisc type media player.

When the user's marked selections are transferred to the PC 104, and a transaction is selected by the user, any one or more of many types of transactions can be carried out. Generally, however, the transactions can be carried out in one or more of at least three basic categories: 1) an information query relating to the music selection, 2) a financial transaction relating to the music selection, and 3) a communication function relating to the music selection. An exemplary information query might be to obtain background information about the artist or the musical selection. An exemplary financial transaction might involve purchase of music or merchandise related to the selection. An exemplary communication function might involve communicating a music sample to a friend, or forwarding a playlist to a friend. Certain transactions may involve more than one of these categories or may be outside these categories without departing from the invention.

At least two forms of the Music Marker application are contemplated—a Basic System, designed to meet the current software support system available at the commercial introduction of Sony Corporation's NetMD™ series product line and an Advanced System, designed for a enhanced functionality. The advanced system is based upon modifications to the basic hardware and/or software used with the exemplary embodiment.

Figure 2:
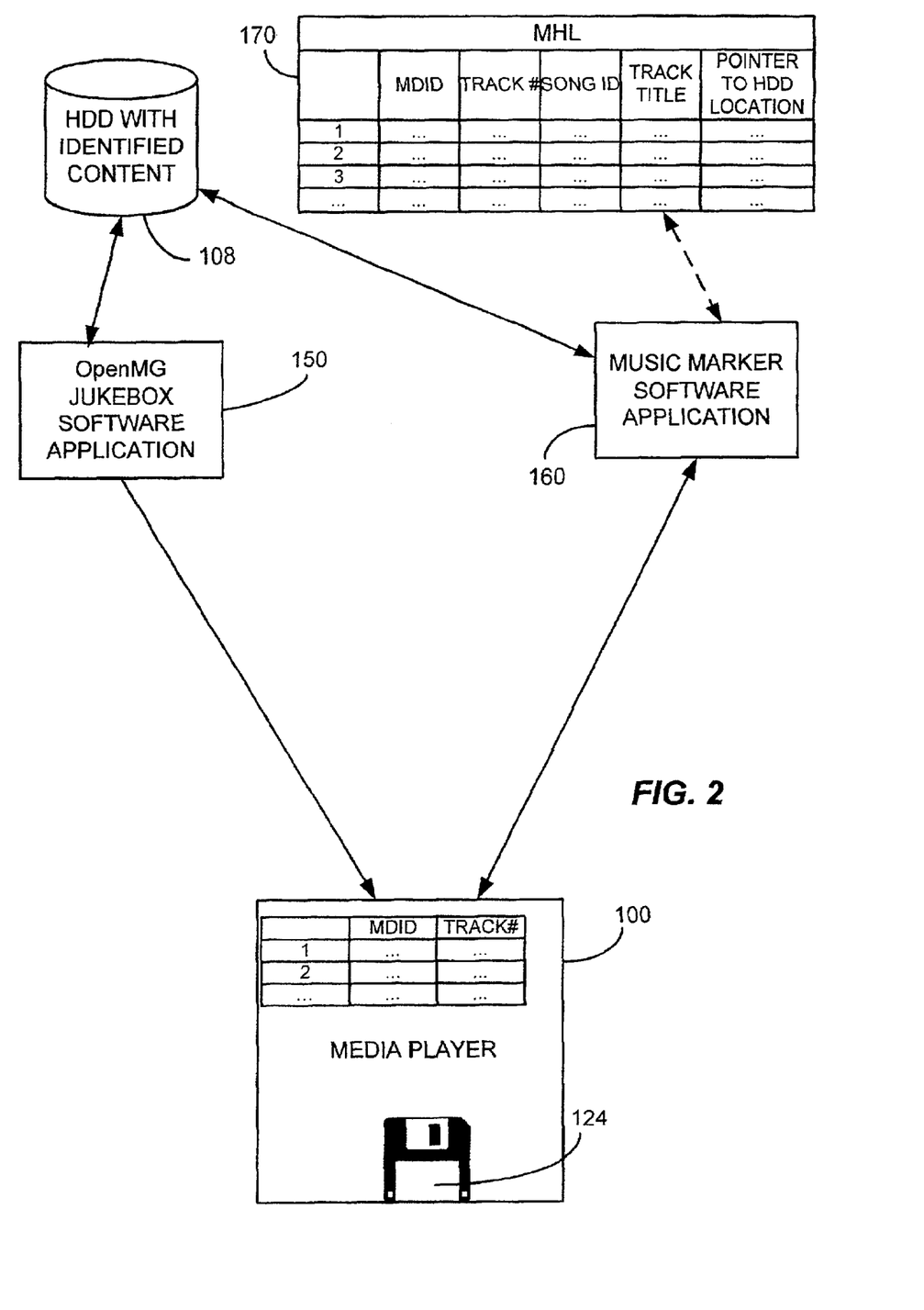
FIG. 2 is a diagram of an architecture of an exemplary basic embodiment consistent with the present invention.

The software architecture of the Music Marker Basic System is illustrated in FIG. 2. In this system, the exemplary MD player 100 plays an MD disc 124. Media player 100 is coupled to the PC 104 that has HDD 108 containing identified content. The PC runs a Jukebox application such as Sony Corporation's OpenMG™ Jukebox 150, as well as the Music Marker Application 160. The Music Marker Application creates and optionally manages an optional Marker History List (MHL) 170.

In a first and simplest embodiment of the basic system, there is no MHL 170. Thus, there is no need for the music marker application to create and manage the MHL 170. In this first embodiment, the music marker application retrieves the list of marked tracks from the media player 100 and directly interfaces with the HDD 108 to identify the marked tracks. No record of the tracks is retained in the MHL 170. Otherwise, operation is as described below wherein the music marker application creates and manages the MHL 170.

In all implementations of the basic embodiment, there is no interaction between the Jukebox software 150 on the PC and the Music Marker Application 160 for the purpose of registering, identifying or any other interaction with the media player 100. The Music Marker Application 160 runs the identification process using the MHL table 170 for identifying and recognizing or correcting any other information about the content on the HDD 108. Any new content recognition can be done periodically by a timed task. In this implementation, writing to the Table Of Contents (TOC) area on the MD during the recording stage is not contemplated. That limitation reduces the possible number of Native Discs and therefore suggests that the user may have to frequently insert the media with the marked track into the media player for identification purposes.

Identifying, for purposes of this document, means that a particular selection of music is determined to be associated with a particular code or text that can be used for purposes of later retrieval of information related to the track of music, and/or associated with a location on a particular album, CD or other media. By way of example, but not limitation, a particular track might be identified by an identifier such as an ID3 tag as used in MP3 files, Title or other file descriptor that can be used to uniquely identify the selection.

The Music Marker Application 160 interacts with media player 100 independently of Jukebox 150 in the Basic system described. The MHL 170 database created by the Music Marker Application 160 tracks the location of the track in the HDD 108, the MD Identifier or identifiers (MDID) associated with the track and the location of the track on the MD as well as possibly a unique identifier of that track (i.e., a track UPC number). In this system, the only time that an MD can provide TOC information to the MHL 170 is when a track that is on that MD has been marked and that mark is now downloaded to the PC. Since in the Music Marker Basic implementation there is no interaction between the Jukebox 150 and the Music Marker Application 160, no special action takes place during times of recording. When a connection is made between the media player 100 and the computer 104 during the marking and download process, all TOC information is pulled from the media to the MHL 170.

In accordance with certain preferred implementations of the present invention, the current Music Marker application 160 is designed to interface with Sony Corporation's OpenMG™ Jukebox—a music player application that runs on PC 104 which is designed to allow for secure content transfer between the PC and a portable music player such as a NetMD™ series MD player. The OpenMG™ Jukebox is built as a user interface, however other jukebox applications could also be used without departing from the present invention. Sony Corporation's OpenMG™ technology is used as the background mechanism that provides a copyright security mechanism for content transfer between player/recorder devices and the personal computer.

Figure 3:
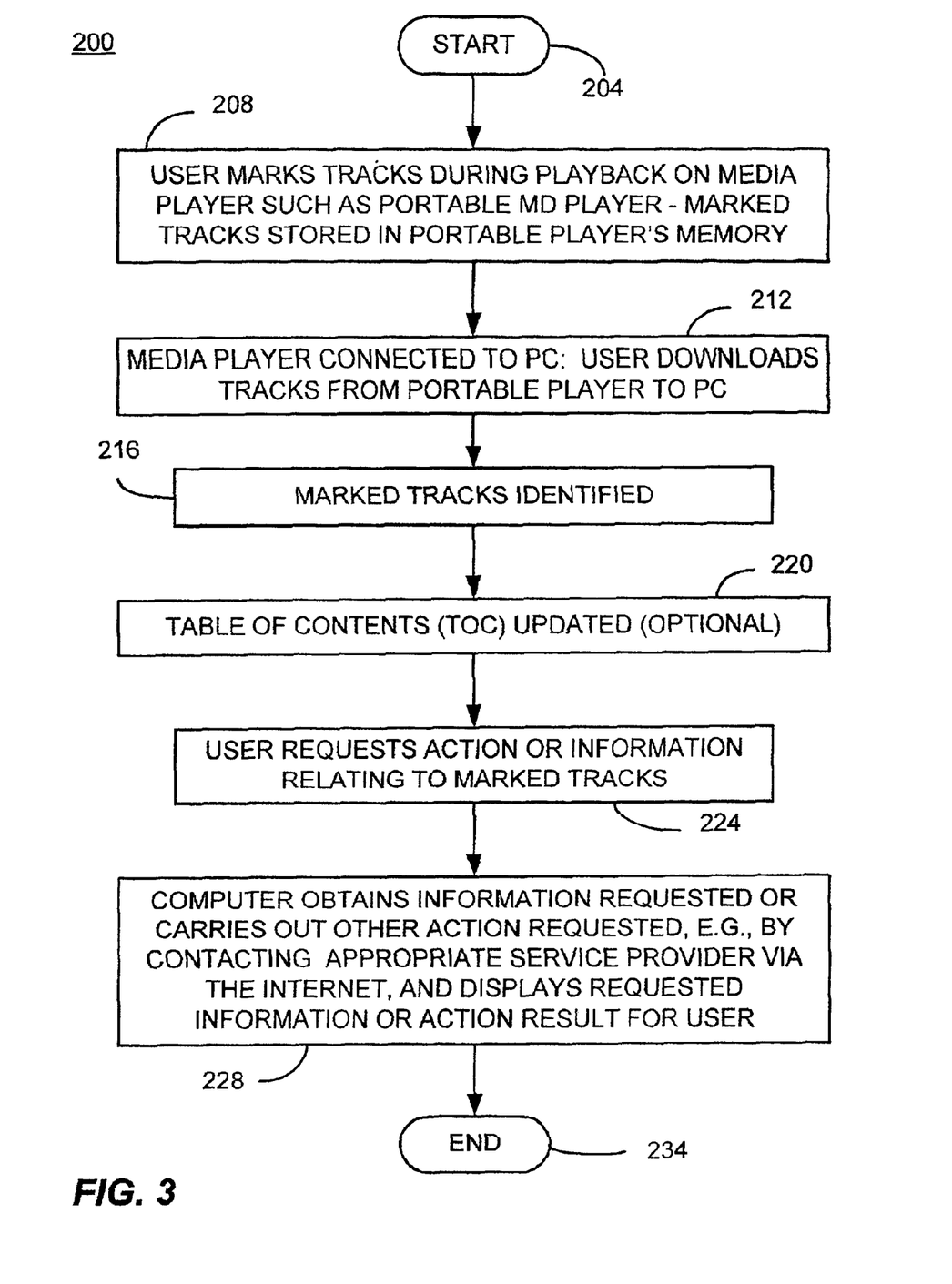
FIG. 3 is a flow chart generally describing one mode of operation consistent with certain embodiments of the present invention.

FIG. 3 is a high level flow chart 200 illustrating one flow of how a user might use the current Music Marker feature in conjunction with the media player device 100 of FIG. 1 starting at 204. At 208, while the user is playing back a music selection, he or she may become interested in some aspect regarding the current selection that is not readily available from the current location using the currently available resources. By way of example, and not limitation, the user may wish to know if the current artist has a new album, or may wish to know if the artist will be in concert nearby in the near future, or may wish to identify other artists that have a similar style or play a similar genre of music, or may wish to obtain concert tickets, or may wish to purchase the artist's earlier album. Many other possibilities exist.

In accordance with one aspect consistent with the present invention, the user may "mark" the currently playing track in order to later find out the information desired or carry out other activities desired. This is carried out, for example, by activating a dedicated "mark button" on the player 100 or by activating a dual use (or multiple use) button on the player 100. By way of example, the player's play button can be used to mark a selection by holding the play button in the activated position for, e.g., one second or more while the selection is playing. When the selection is marked, a notation is made in memory 134 (and preferably on a display of the media player 100) that the currently playing track has been marked. This can be accomplished in any suitable manner including, but not limited to, storing a media and track identifier in a suitable location in the memory 134.

Once the media player 100 is connected to personal computer (PC) 104, at 212 (for example when the user returns home), the software residing in the PC 104 queries the media player 100 and determines that marks have been made. Those marks are then downloaded to a PC and identified at 216 in a local database on HDD 108 or a remote database at a service provider such as 112. In certain embodiments, this identification process may make additional information available that can be stored for later use in the TOC of the media 124. In this embodiment, the TOC may be updated at 220.

At this point, the user may make various requests or take various actions associated with the marked tracks at 224. This may be carried out in one embodiment by presenting the user with a list of all known actions that can be taken with respect to each of the marked tracks using a window or menu format. The user can then make his or her desired selections and the personal computer 104 then takes appropriate action to fulfill the user's desires. This is often accomplished by sending appropriate queries to one or more service providers such as 112 via the Internet at 228. When the results are received, they are presented to the user for further action at 228. The process then ends at 234.

In the embodiment just described, the music marker application runs on PC 104 to effect a user interface as well as an interface between the HDD 108 and the media player 100. However, this should not be considered limiting, since an equivalent application can be developed that is totally web based. That is, the content can be identified and the other basic functions of the music marker application can be realized in a Web based server application rather than a PC based client application. Such an embodiment can utilize vast databases of content to assist in the identification process that exceeds that which might be present on the HDD in a user transparent manner.

Thus, by this process, the user is able to simply press a button on the portable music player to create an electronic reminder that he or she wishes to carry out a future action associated with that music track at a later time.

Figure 4:
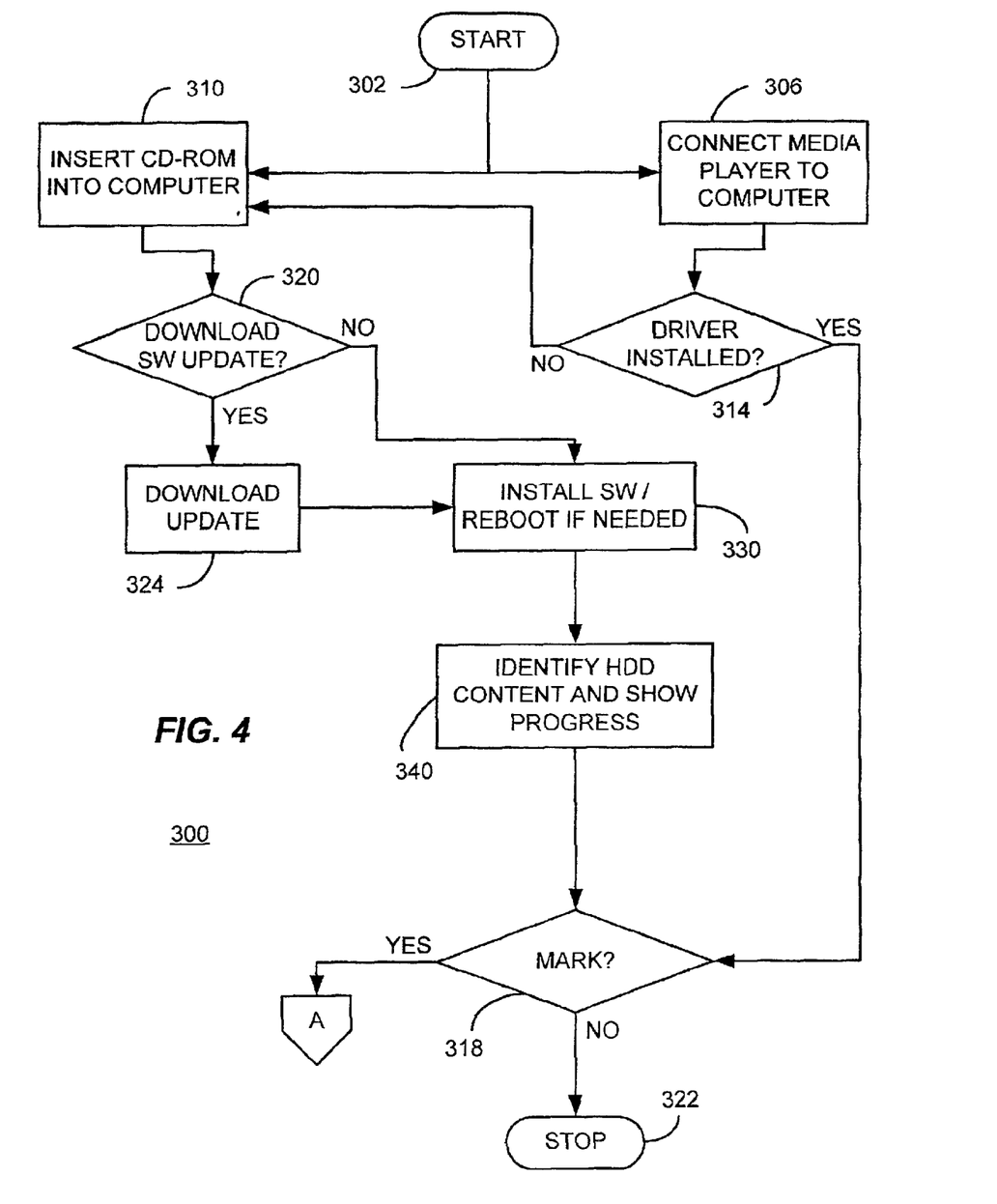
FIG. 4 is a flow chart describing an installation and initiation process consistent with certain embodiments of the present invention.
Figure 5:
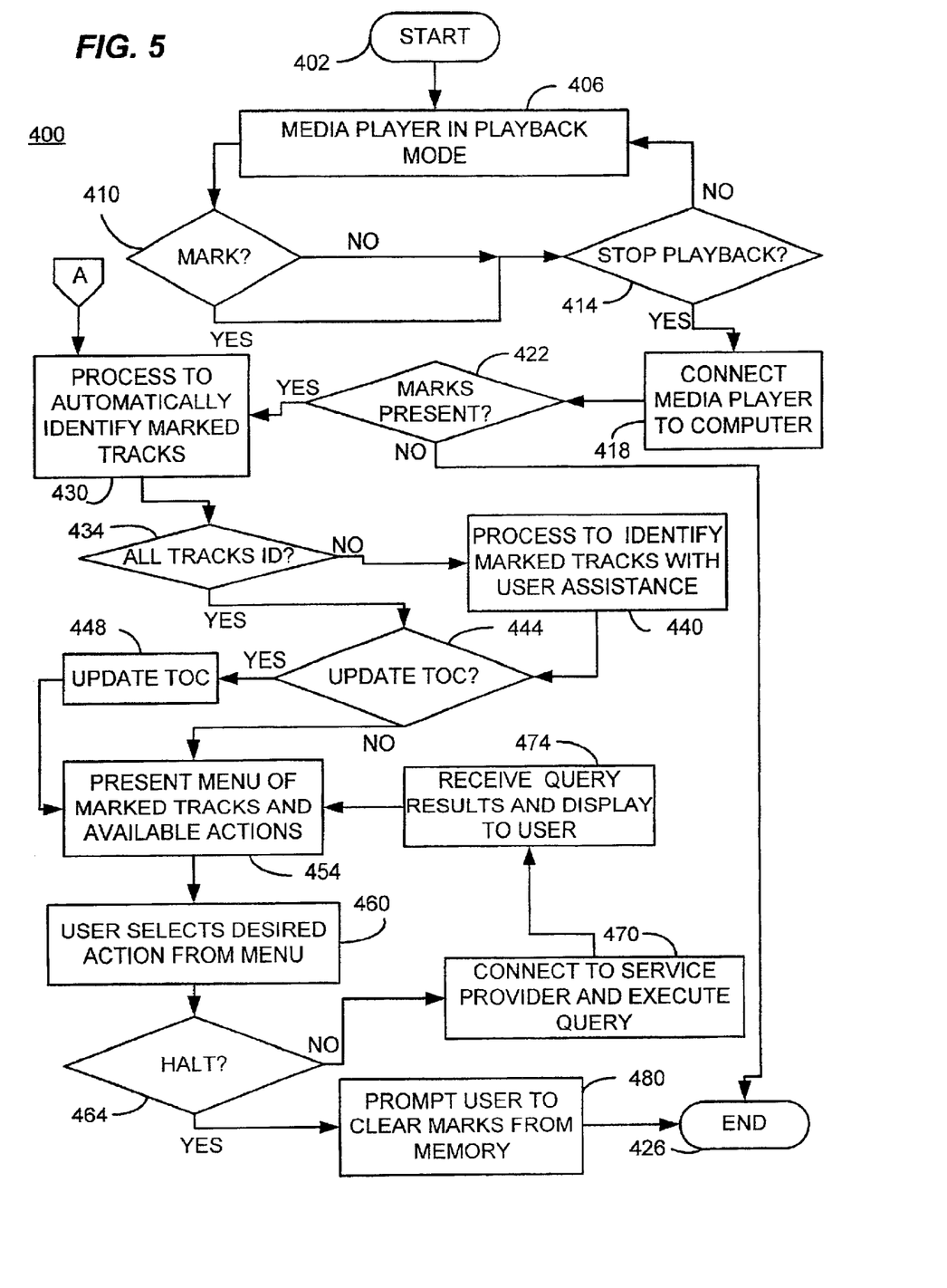
FIG. 5 is a flow chart showing a more detailed operational mode consistent with certain embodiments of the present invention.

In order to utilize this invention, an installation and initialization process 300 such as that shown in FIG. 4 can be initially carried out starting at 302. The process can be carried out either by connection of the media player 100 to the computer 104 at 306 or by inserting a disc such as a compact disc containing the software at 310. Whenever the media player 100 is plugged into the computer 104, a check is carried out to determine if a driver for the media player 100 is installed at 314. If so, control passes to 318 where the media player is checked to see if it contains marks stored by the user. If not, the process ends at 322. If so, a mark processing procedure (at 430) is carried out as shown in FIG. 5 and as will be described later.

If the driver is not installed at 314, the installation proceeds after insertion of the program carrying media into the computer at 310. If a software update is known and it is desired to update the software at 320, the update is downloaded using any known download process at 324. The software and/or download is then installed on the PC 104 and the PC 104 is rebooted if necessary at 330. Once the new software has been installed, a process is carried out at 340 to identify all of the music stored on the HDD 108 of the computer 104.

In carrying out the initial identification process, many of the tracks may be identified by their ID3 tag or by a disk and track identifier or other information known to the PC. Other reference media, for example, foreign media may require manual input from the user in order to create an unique identifier for the track. In any event, once they are identified, the initialization process and software installation process 300 of the current embodiment is complete. Other processes may also be used to carry out an installation and initialization of the software.

Thus, the first time that the media player 100 of the exemplary embodiment is connected to the PC 104 (e.g., via USB connection), assuming there are marks stored in the media player 100, the user is prompted to install the Music Marker Application 160 on the PC 104. Part of the software installation process takes the user through the process of recognizing tracks that exist on their HDD 108. That process might utilize Internet connectivity for the purpose of matching a track with information existing on a remote database. A progress bar can be provided indicating progress in the recognition process for recognition of tracks on the HDD 108. A counter can also be provided to show the number or percentage of tracks recognized and possibly indicating estimated remaining time for completion of the recognition process. In the current embodiment, the Music Marker Application 160 is automatically started at the time of installation. Next time that the MD player 100 is connected to the PC 104, the Music Marker Application interface automatically starts only if new marks exist on the MD player 100.

Once the software is installed and initialized, the user can playback music on the media player 100 and make marks as desired and the one time installation process need not be repeated except to repair corrupted files or update the software applicaiton. This process, in accordance with certain embodiments of the invention, is described in connection with FIG. 5 as process 400 starting at 402. When the media player 100 is in playback mode at 406, the user may actuate a Music Mark control button or other control at 410 any time during playback of a track of music to store information in the memory 134 referencing the selected track until the playback is stopped at 414.

When the media player 100 is connected to the computer 104 at 418, the computer 104 determines if there are any marks at 422. If not, the Music Marker program 160 terminates at 426. If there are marks at 422, a process is carried out at 430 to automatically identify any such marks. (This process 430 is also the entry point from 318 of FIG. 4.) This process at 430 is a straightforward process of matching the identifying information associated with the marked track(s) in the media player with those stored in the HDD 108. If there are marked tracks that are not identified in the HDD 108, a further attempt to identify the marked track(s) can be automatically initiated using resources of designated service providers such as 112 via the Internet, in accordance with certain embodiments. In cases where the content is not identified (i.e., no TOC information is available about the track, artists, album, genre), identification can be attempted using various methods including, but not limited to, matching the content to known content by use of acoustic sampling, length comparison, name and title fuzzy match or any other method.

Once all automated resources to identify a track have been exhausted at 430, the software determines if all tracks have been identified at 434. If not, a manual process of track identification is carried out at 440. In certain embodiments, this can involve having the user manually type in or otherwise enter suitable information such as track names, album names, artist names, record company, etc. in order to manually associate enough information with the track to permit a suitable query for the further information that the user might wish to ascertain or carry out other action as the user might wish to carry out.

When all of the tracks have been identified, and if the media player 100 is also capable of recording to the media, the user may be given an option to update the table of contents (TOC) data stored on the media to include the information learned during processes 430 and 440 at 444. The TOC can then be updated at 448 or 448 can be bypassed according to the selection at 444. In either event, control next passes to 454 where the user is presented with a menu showing all of the marked and now identified tracks and of the options available to the user for obtaining further information or carrying out additional actions. The user can then select an action from the menu at 460 and if the action selected is not to halt the program at 464, the computer 104 connects to the Internet (if necessary) and presents an appropriate query to an appropriate service provider to carry out the user's desired action. In one simple scenario depicted in process 400, a simple query may be executed to inquire about a concert schedule for the artist of the track or make some other information query at 470. Results of this query are then returned and presented to the user at 474. In other scenarios, other actions can develop from 470 to fulfill the users request for a particular action without departing from the invention. Control ultimately returns to the menu at 454 until the user elects to exit the program at 464. When this occurs, the user is prompted to clear the marks stored in the media player memory at 480 and the process ends at 426. Many variations in this process will occur to those skilled in the art without departing from the present invention.

Figure 6:
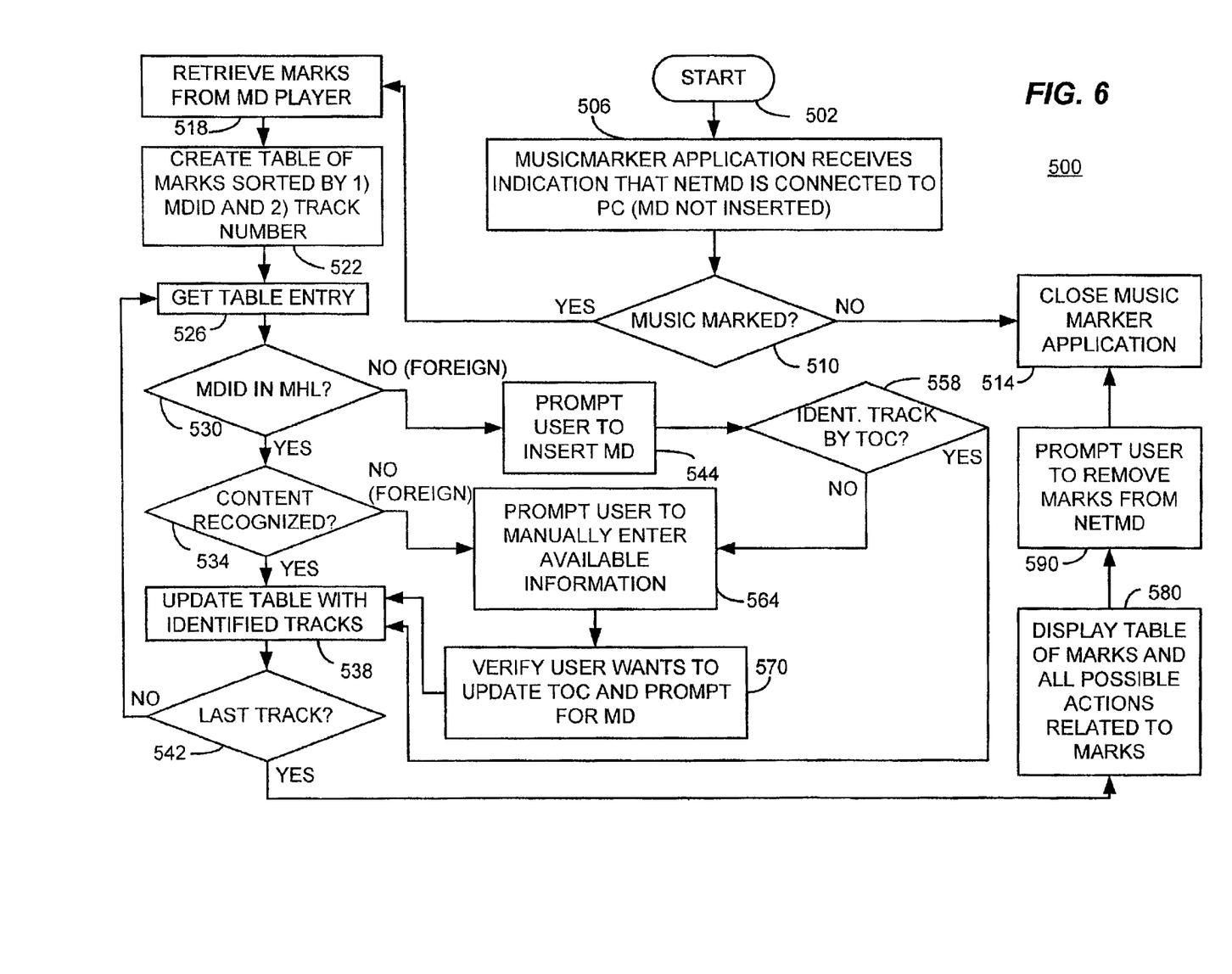
FIG. 6 is another flow chart showing a more detailed operational mode consistent with certain embodiments of the present invention.

In certain preferred embodiments of the invention, the media player 100 is realized as a minidisc player/recorder that is compatible with Sony Corporation's NetMD™ series of minidisc players, as has been described. FIG. 6 describes particularly one embodiment of the present invention using an MD player/recorder and the NetMD™ series product line. Operation according to this embodiment is shown as process 500 starting at 502. In this embodiment, the Music Marker software application 160 residing on the Personal Computer 104 receives a signal at 506 indicating that the minidisc player is connected via an appropriate interface such as USB to the PC 104. If no marks are stored in the MD player's memory at 510, the Music Marker application 160 terminates at 514.

If marks are present at 510, the marks are retrieved from the MD player 100 at 518 and a table of marks is created in the PC 104 at 522. In accordance with this embodiment, though it should not be considered limiting, the table of marks is sorted first by the MD's identification number (MDID) and second by the particular track number that was marked. By use of this sorting order, each of the marked tracks from a single MD (or other media) is handled while the media resides in the media player. Thus, if multiple tracks of a single MD are marked, they are identified while the media is in the media player 100 without regard for the order in which the tracks were marked. This prevents the user from having to reinsert the same media into the media player 100 repeatedly during a single identification session. Starting with the first entry of the sorted table, a table entry is retrieved at 526. The PC 104 contains a database of all of the music stored on the PC and identified by the Music Marker software application. This database creates a record in the Marked History List (MHL) 170 that contains the MDID, track number and a song identifier (which could be a UPC number, an ID3 identifier, a title, etc.) for all content that has been identified in the Music Marker application.

At 530, the process determines if the MDID is present in the MHL 170. If so, and if the content is recognized at 534, the table is updated with the identified tracks at 538. If the current entry is not the last table entry at 542, the process returns to 526 where the next table entry is retrieved and similarly processed.

In the event the MDID is not present in the MHL 170 then the user is prompted to insert the MD containing the track at 544. The system then attempts to identify the track from information in the TOC of the MD at 558. If the track is identified, control passes to 538. If the track is not identified, control passes to 564 where the user is prompted to manually enter available identifying information. Similarly, if the content is not recognized at 534, control passes to 564.

Once the track is identified, the user is presented with the option at 570 of updating the TOC (and prompted to insert the MD if necessary). The user may then either accept or decline to update the TOC of the MD and control returns to 538.

Once all tracks have been processed at 542, control passes to 580 where a table of all marks is displayed and the user can take desired actions to carry out transactions or conduct queries associated with each marked music selection. After carrying out all such queries and transactions, the user is prompted to delete the marks from the MD player/recorder at 590 and the application is closed at 514.

At 580, when the user is presented with the list of marked tracks and options for actions to carry out associated with each track, any suitable user interface can be developed to carry out this function.

As part of the mark processing described in process 500, the MD player or other content player 100 is connected to the PC 104 (In this example as illustrated in the flow chart, the MD 124 is not inserted into the media player.). The MDID, Track# and TOC are read by the Music Marker Application 160. The information is compared to the existing information in the Marking History List 170 (MHL). If there is no match to any existing MDID in the MHL 170 the MD is considered a Foreign Disc (A foreign disc is an MD that has no MDID that is listed in the MHL 170. In general, the foreign MD was either recorded using a different PC from the one reading the marks, recorded by means other than a PC or can be a Native Disc that was in any way altered (track deleted, added or change of track order on the MD) after being recorded using the Jukebox application).

The track from the foreign disc can be identified by either using information on the TOC area (requiring the user to insert the MD into the media player) or manual data entry by the user. In the case of a Native Disc (an MD that has an MDID that is listed in the MHL 170), the track information is compared to the data in the MHL 170. If track is still not identified it is considered Foreign Content that can be identified by the user. (Foreign Content is content stored on the MD that cannot be identified but still has an MDID that is recorded in the MHL 170 ). This unidentified content can be the result of having older content on the MD. That content might have been recorded on the MD before the Music Marker Application identified the content on the HDD. Note that the MD can contain some new content that was recorded to it through a jukebox (Native Content) in addition to the foreign content. Also some foreign content can be recorded through means other than the PC (i.e., direct recording from a CD player)).

The track recognition process continues until all marked content in the Marking List is processed. Once processed, the Marking List is displayed with the identified information and the possible options related to each track. The user selects his or her desired option and by doing so, launches a service corresponding to the option (i.e., find information about artist/album, show merchandise options, etc.).

Figure 7:
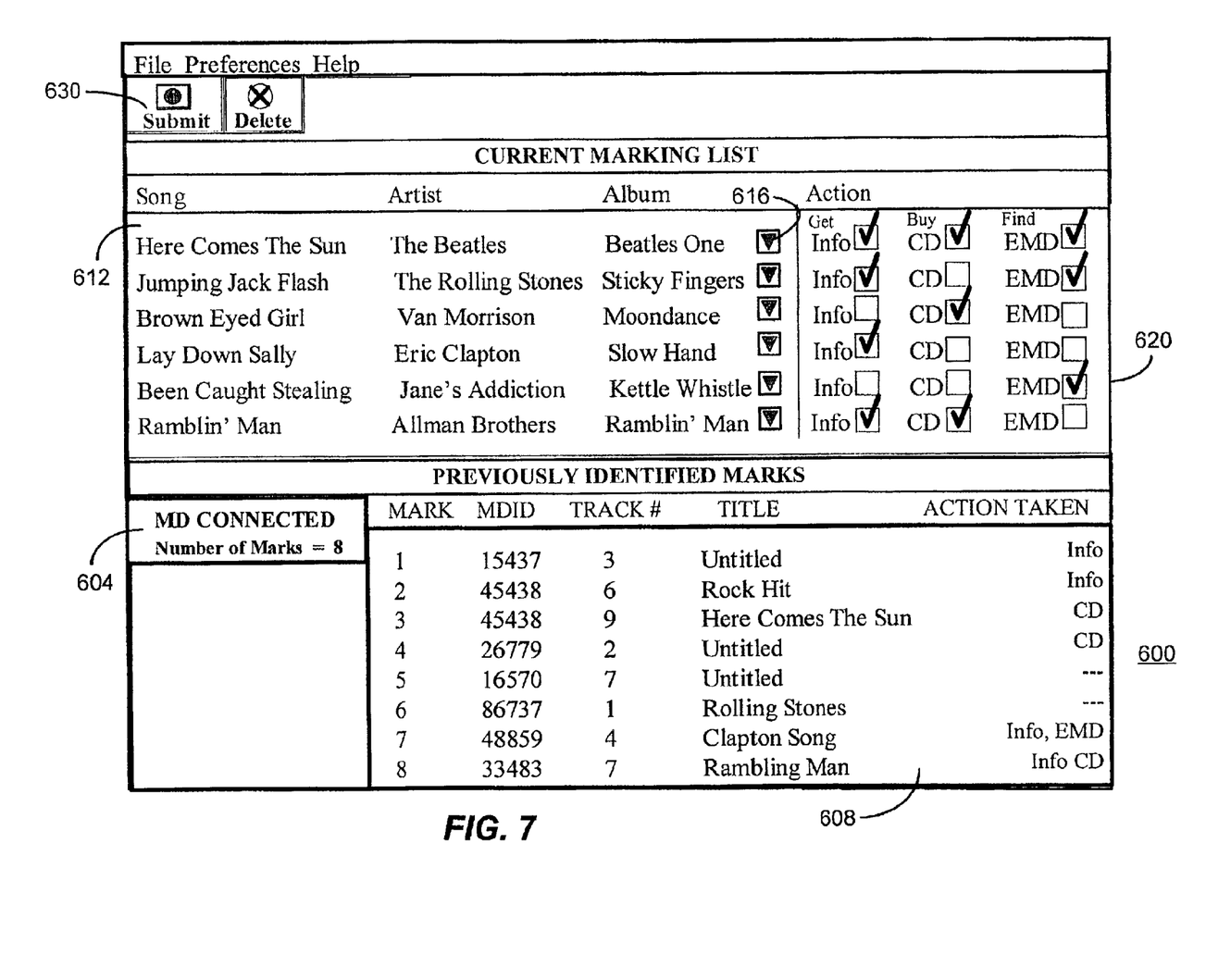
FIG. 7 illustrates an embodiment of a user interface consistent with certain embodiments of the present invention.

One illustrative example of a user interface 600 suitable for carrying out one embodiment consistent with the present invention is illustrated as FIG. 7. In accordance with this embodiment, a box 604 indicates that the MD player is connected to the PC and that there are eight (in this example) marks stored in the MD player's memory. Box 608 shows a list of the marks stored in the MD player's memory chronologically and identified by the MD number, track number and title. Those tracks marked "untitled" are tracks whose title was never updated. These tracks can still be identified tracks. The box 612 shows relevant information about the marked tracks after identification by the Music Marker software 160. In this example, the song title, artist and album are identified.

Buttons 616 are provided for each music selection to play back the marked track. Box 620 illustrates one limited form of action that the user can take for each of the selected tracks according to this embodiment. In this box, the user can check off boxes to indicated that he or she wishes to obtain all available additional information about the track, purchase a CD via mail order or purchase the track via Electronic Music Distribution (download). Other selections can also be provided including emailing information or a music sample to another user regarding a particular selection, purchase other merchandise or join an artist fan club. Other actions too numerous to mention are possible without departing from the invention.

Box 624 is used to identify one or all of the tracks that are untitled as well as add tracks or remove tracks from the marking list to a list of previously identified tracks.

Once a user has made the query or other action selections in box 620, they are submitted by selecting (double clicking) button 630. The user interface described is intended to be an illustrative example. Many other suitable user interfaces can be devised without departing from the present invention.

While much of the present discussion has related to identification of actual tracks of information on a recorded disc, the term "track" should be broadly interpreted to encompass either actual disc tracks or files stored in volatile or nonvolatile memory or other storage media in the form of data files.

As described above, the Music Marker application provides a solution for storing an indication of interest in a selection of content such as a music selection or other recorded selection at the moment of playback. The Music Marker application 160 also provides a solution for later retrieval on the PC 104 and a method for facilitating the user's request via the Internet. Music Marker can be built into any digital music player such as Sony Corporation's NetMD™ series product line containing some form of electronic memory storage and removable media. By use of this Music Marker feature the user is able to interact with the content that he or she is playing on their MiniDisc player or other media player 100. Thus, the functionality of the MD is expanded by providing tighter integration with one or more Internet music related services. As such music service offerings become more robust, the value of the Music Marker feature further increases. The music marker function allows the user to set a mark associated with a specific track of music that they are listening to on the MD. The user can define what they desire from marking this music later when they return to their PC or wherever they are able to interact with a service using other suitable connections such as a wireless connection or direct connection to a service.

The above-described system provides the user with the ability to:

Retrieve information relating to the song, artist, or similar genre that they are listening to such as cover art, concert dates, merchandise, promotional material, etc.

Purchase CD's of the artist or similar artist that they are listing to: CD of an EMD track, new CD's by artist, earlier releases, etc.

Purchase EMD content relating to the song, artist, or similar genre: New tracks, promotional tracks, similar genre tracks, etc.

To further summarize, without limitation, the general operation of certain embodiments of the present invention, during playback of a track of music (contained on MD media), the user presses Music Marker button, which activates music marker function. The media player hardware device stores track number and MD media ID in available memory area in MD hardware. Next, the user inserts different MD media into media player and the above process is repeated. Next, the user connects media player to PC via, e.g., the USB interface or any suitable digital communication interface including, but not limited to IEEE 1394 or wireless communication methods. Upon connecting the hardware, Music Marker PC application is launched. The Music Marker application reads the list of marked tracks from the media player and communicates with a music identification service to identify track and artist; and transfers track and artist information to music service. The Music Identification Service fulfils the user's request.

Figure 8:
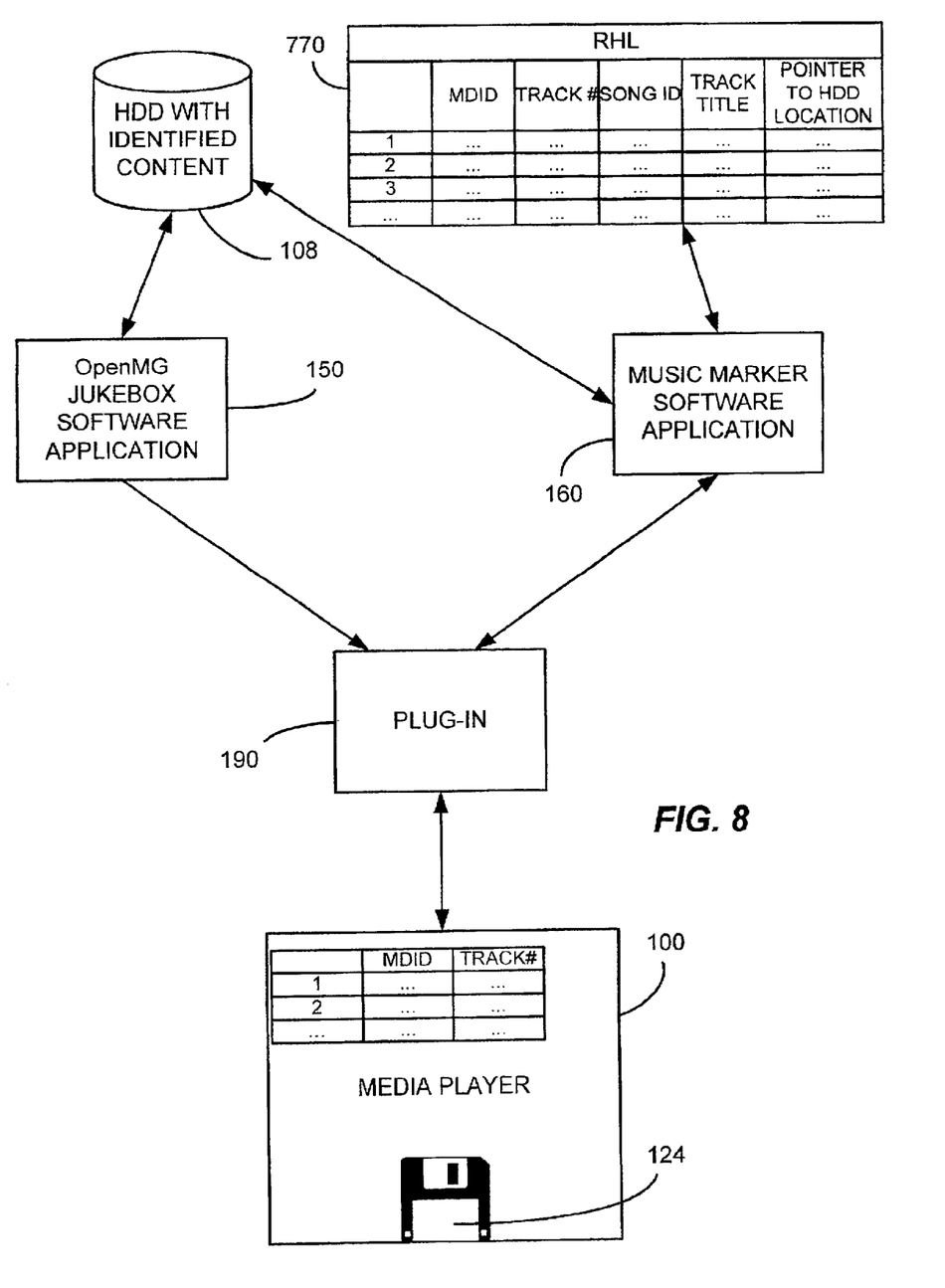
FIG. 8 illustrates an architecture of an advanced embodiment consistent with the present invention.

In addition to the basic system described above, there is contemplated an Advanced system as previously mentioned. The contemplated Music Marker Advanced System architecture is illustrated in FIG. 8 and uses the capability of the PC 104 to identify all MD's that were recorded with the same PC that was used for the marking identification process. However, since content on the HDD 108 or any Native Disc is tracked and identified by the Music Marker Application 160, there is no need to insert the MD into the MD player device (i.e., NetMD™) unless it is a Foreign Disc or Foreign Content. The Music Marker Advanced System provides all of the features described in the Music Marker Basic System above but avoids the need for the user to identify every individual track on their Hard Drive. Instead, an automatic one-time identification is carried out along with creating an automatic identification for any future MD recording. In this Advanced system, there is no need to insert the MD into the media player 100 in order to identify music unless it is one of the following two cases: Foreign Disc or Foreign Content.

In this advanced system, the Marking History List 170 of the basic system is replaced by a Recorded History List (RHL) 770. The RHL 770 performs all of the same functions as the MHL 170 of the basic system and is used for further functions as will be described below.

In order to carry out the additional functionality of the advanced system, a media player device interface 190 is implemented as a plug-in that can communicate with the Music Marker Application 160 as well as the Jukebox. This is illustrated in FIG. 8. Exchange of information related to the OpenMG™ technology and HDD 108 activities can be communicated through the Plug-in 190 to the Music Marker Application 160 in order to register all tracks in the RHL 770. In addition, the Plug-in 190 is able to write updated track information to the TOC area on the MD 124 in order to facilitate any future identification tasks. Thus, the RHL 770 is recording based and not marking based only as in the basic embodiment's MHL 170, but other functions operate in a similar manner.

FIG. 8 describes the structure of the components involved in recording and marking of tracks using the media player. The Music Marker Application 160 can track the interaction between the Jukebox 150 and the MD player 100 via the Plug-in 190. The Music Marker Application 160 can access the tracks stored by Jukebox 150. The RHL database 770 created by the Music Marker Application 160 tracks the location of the track in the HDD 108, the MDID (possibly more than one) associated with track and the location of the track on the MD as well as possibly a unique identifier of that track. The installation process is similar to that described above for the basic system. Any new content recorded to the HDD after the initialization (install process) will be identified when the Plug-in indicates to the Music Marker Application that new content has arrived.

Figure 9:
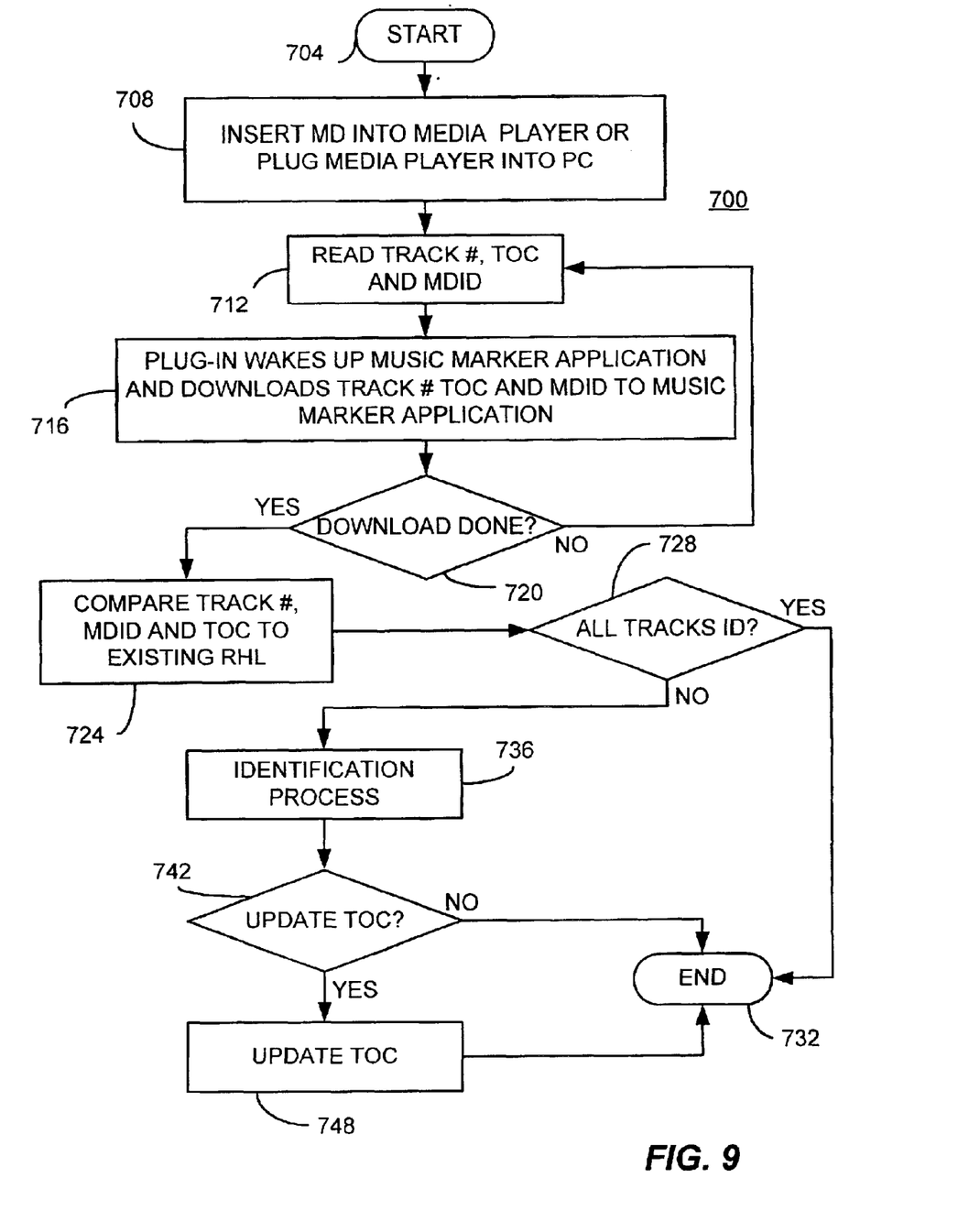
FIG. 9 is a flow chart illustrating operation of the plug-in shown in FIG. 8.

The operation of the Advanced Music Marker application with Plug-in 190 is illustrated in FIG. 9 as process 700 starting at 704. The Plug-in 190 identifies whether the media player 100 and the PC 104 are connected or not, when a new MD 124 is inserted into the media player 100 and when content is being written into the MD 124 or any other content alteration takes place while the media player and 100 and the PC 104 are connected together.

In process 700, when an MD 124 is inserted into the media player (with the media player connected to the PC) or when a media player 100 containing an MD 124 is connected to the PC 104 at 708, the MDID, Track# and TOC are read at 712 by the Plug-in 190 and the information is communicated to the Music Marker Application 160 at 716. Until the download of information is completed at 720, this process continues. At 724, the information is compared to the existing information in the Recording History List (RHL) 770. If there is a match to an existing MDID in the RHL 770 the corresponding tracks have been previously identified. If all the tracks are identified at 728, the process ends at 732. However, if there is at least one unidentified track at 728, an identification process or processes are carried out at 736. The user is then given the option to update the TOC at 742. If no update is desired, the process ends at 732. If an update of the TOC is desired, the update is written at 748 and the process ends at 732.

The Music Marker Application 160 identifies when the recording process is done in order to read the correct and final MDID from the media player 100. In order to do that, the Plug-in 190 triggers a recording complete event and sends a notification of the event to the Music Marker Application 160. The new MDID, Track# and TOC are now read by the Plug-in 190 and are sent to the Music Marker Application 160. The Music Marker Application 160 replaces the MDID and Track# for these tracks that require change in the old RHL data, or stores the new information in the RHL if no older MDID is found. Using the TOC information and the RHL matching process the Music Marker Application 160 identifies a particular track. In case that there is an unidentified track (Foreign Content) the user can help identify content by manually entering information related to that track (artist, album, genre, etc.) as with the basic application. The Music Marker Application 160 uses the information to identify tracks as described with the Basic Application. Once identified, the Music Marker Application 160 writes this information into the RHL 770 and to the TOC area on the MD 124.

Unlike the MHL 170 of the Music Marker Basic Application, the RHL 770 in the Music Marker Advanced Application contains records of all MDs recorded on the PC 104. In the Music Marker Basic Application, it is quite possible that an MD is treated as a Foreign Disc in spite of the fact that it was recorded on the same PC used for reading that marks. In the Music Marker Advanced System, any PC-based editing process (recording, renaming, changing track order, deleting, etc.) that happened after the Music Marker Application was installed essentially keeps the MD a Native Disc.

Thus, the Music Marker application allows the user of a media player device to interact with music by marking specific music tracks that are important for that user. The Music Marker application reads media ID and track number from media player 100's memory area and stores this information in local database on the personal computer 104. The Music Marker application displays a "Marking List" to the user and identifies information matches between the data on the MD and data in a reference database (RHL) on the PC. In case that there is no match, the user can insert the MD into the media player 100 for further identification. Upon insertion of the correct media, the Music Marker application reads the TOC area of media and reads the title associated with the track # being identified. Additionally, in certain embodiments, the Music Marker application can call up a service to identify title, artist, album, etc.

In certain embodiments, the Music Marker application displays a list of the marked and identified tracks with a list of possible user requests associated with that track list. The user can select an action for each mark in list and the Music Marker calls up a service to facilitate the request placed by the user, e.g., via the Internet. The user can view, track, update and manage their list of marks and the user can exchange lists of marks with other users in order to share playlists, taste, and exchange tracks or other information related to tracks.

While the above embodiments have used an MD as an illustrative removable recording medium storing the music selections (or non-music recorded tracks), other removable recording media is equally suitable without departing from the invention. For example, the storage medium could be any of a minidisc, a compact disc, a magnetic disc, an optical disc, a video disc, a memory stick, a removable memory card, a battery backed removable volatile memory and a removable nonvolatile memory.

Certain embodiments of the Music Marker Application allow for identification of content on Native Disc, Native Discs with Foreign Content as well as Foreign Discs. Other embodiments are contemplated to improve the user experience with the Music Marker feature by, for example, eliminating the need to insert MD into the media player 100 for the process of track identification and improve the track identification. Such improvements may require hardware and/or software modifications over the systems described previously herein.

In one modified embodiment, a change to the software and/or hardware allow the MD player to send a small portion of a track from the media player 100 back to the PC 104. This allows the Music Marker Application to locally identify the track or to send the short data stream for identification service. In the second case, the short data stream is analyzed at a remote location using acoustic property analysis tools. The information is then matched with a database for identification. This feature also allows users to exchange short portions of tracks in order to share tastes or recommend tracks or artists to each other. The sharing of content in that manner can occur via an exchange of Marking List using a PC and Internet connection or via a direct exchange of a marks between players by means of cable connection or wireless communication.

In another embodiment, a larger memory can be provided in the media player to permit the table that stores the list of marks to store more data to aid in the identification process and minimize need to reinsert the media. By way of example, the MDID, track number, title, and other identifying information could be stored in the media player as a result of a user marking a selection. Additionally, a portion of the actual track that has been marked (or even the entire track) could be stored to assist in identification. In such embodiments, the need for the user to reinsert the media which is marked can be reduced or eliminated. Other embodiments will occur to those skilled in the art.

The ability to mark music and share these marks with peers can provide a shared music experience between users. Marks can be transferred between users in order to demonstrate a similar taste or in order to recommend an artist to a peer. Sharing can be done via physical exchange of MD, wireless, wired or other manner. A list of marks can be exchanged via email or using other electronic communication technology or can be posted on a web page.

In one embodiment of the current Music Marker Application, implementations of the media player can only store a limited amount of information. The information may be limited to MDID and track number for every mark in either the Basic and Advanced forms of the implementation. However, it is contemplated that in later implementations, storage can be expended to include more information such as universal track ID. There are various universal track identification systems. In all these systems an alphanumeric string identifies an individual track (can also distinguish between different recordings of same song). Increasing memory size on the media player 100 to include a longer string will allow recognition of tracks on foreign disc as well as prevent the need of inserting MD into the media player.

For ease of explanation, this document concentrated on an embodiment using a MiniDisc player, specifically Sony Corporation's NetMD™ series product line. However, the Music Marker feature described can be implemented on any audio capable device which is referred to herein generically as a media player. Applications of Music Marker can be in the area of Home Audio, Car Audio, Boombox and any other device capable of playing music from removable media and any form of internal memory storage.

Since the process of initializing the HDD 108 of the user takes place under the Music Marker feature it is now possible to use the information in order to better manage content using the same interface. The Music Marking feature can be used within a jukebox 150 as another way of displaying favorites, it can also be stored separately as a set of playlists or can be communicated to or from another Jukebox application 150 (personal jukebox preference).

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A media player apparatus, comprising:
a music player for playback of music selections stored on a storage medium;
a processor that controls a portion of operation of the player;
a user interface that receives commands from a user and sends those commands to the processor;
a memory coupled to the processor; and
wherein, upon receipt of a mark command from the user interface, the processor stores an identifier in the memory that identifies a music selection that is playing at the time of receipt of the mark command.

2. The apparatus according to claim 1, further comprising a computer interface coupled to the processor that permits the media player apparatus to be coupled to a computer.

3. The apparatus according to claim 2, wherein the identifier stored in the memory is accessible to the computer via the computer interface.

4. The apparatus according to claim 2, wherein the music player further comprises a recorder, and wherein the recorder can record information to the storage medium that stores the music selections.

5. The apparatus according to claim 4, wherein the music selections are organized on the storage medium using a Table of Contents (TOC) and wherein the computer can instruct the recorder to update the TOC to include additional information stored on the computer.

6. The apparatus according to claim 2, wherein the computer interface comprises a serial interface.

7. The apparatus according to claim 6, wherein the serial interface comprises one of a Universal Serial Bus (USB) interface and an IEEE 1394 bus.

8. The apparatus according to claim 1, wherein the storage medium comprises one of a minidisc, a compact disc, a video disc, a magnetic disc, an optical disc, a memory stick, a memory card, a removable nonvolatile memory.

9. The apparatus according to claim 1, wherein the user interface comprises a dedicated mark button that when actuated sends the mark command to the processor.

10. The apparatus according to claim 1, wherein the user interface comprises a button that sends the mark command in addition to a second command.

11. The apparatus according to claim 10, wherein the second command comprises a play command.

12. The apparatus according to claim 10, wherein the button sends the mark command if actuated during playback.

13. The apparatus according to claim 10, wherein the button sends the mark command if actuated for a predetermined duration during playback.

14. The apparatus according to claim 1, wherein the media player comprises a personal portable media player.

15. A method of operation of a media player, comprising:
playing a music selection stored on a storage medium;
receiving a mark command from a user interface; and
responsive to the mark command from the user interface, storing an identifier in a memory to identify the music selection that is playing at the time of receipt of the mark command.

16. The method according to claim 15, further comprising receiving an instruction from a computer, coupled to the media player via a computer interface, to send a list of identifiers of marked music selections to the computer.

17. The method according to claim 16, wherein the music player further comprises a recorder, and further comprising recording information to the storage medium.

18. The method according to claim 17, wherein the music selections are organized on the storage medium using a Table of Contents (TOC) and further comprising the computer instructing the recorder to update the TOC to include additional information stored on the computer.

19. The method according to claim 15, wherein the storage medium comprises one of a minidisc, a compact disc, a video disc, a magnetic disc, an optical disc, a memory stick, a memory card, a removable nonvolatile memory.

20. The method according to claim 15, wherein the user interface comprises a dedicated mark button that when actuated sends the mark command to the processor.

21. The method according to claim 15, wherein the user interface comprises a button that sends the mark command in addition to a second command.

22. The method according to claim 15, wherein the media player comprises a personal portable media player.

23. An electronic storage medium storing instructions which, when executed on a programmed processor, carry out the method of operation of a media player according to claim 15.

24. A method of operation of a media player, comprising:
playing a music selection stored on a storage medium;
receiving a mark command from a user interface;
responsive to the mark command from the user interface, storing an identifier in a memory to identify the music selection that is playing at the time of receipt of the mark command;
connecting the media player to a computer;
sending the identifier to the computer; and
conducting a transaction over the Internet relating to the music selection identified by the identifier.

25. The method according to claim 24, wherein the transaction is carried out with at least one service provider accessed via the Internet.

26. The method according to claim 24, wherein the transaction comprises at least one of an information query relating to the music selection, a financial transaction relating to the music selection, and a communication function relating to the music selection.

27. The method according to claim 24, further comprising matching the identifier with a information stored in a database in the computer.

28. The method according to claim 27, further comprising obtaining information by manual input in the event there is no match of the identifier with information stored in the database.

29. The method according to claim 27, wherein the storage medium organizes stored music selections using a Table Of Contents (TOC) and further comprising updating the TOC with information stored in the database.

30. The method according to claim 24, wherein the conducting further comprises:
presenting a menu of actions available for the music selection identified by the identifier;
receiving an indication of a selected action from the user; and
conducting a transaction determined by the indication of the selected action from the user.

31. The method according to claim 24, wherein the storage medium comprises one of a minidisc, a compact disc, a video disc, a magnetic disc, an optical disc, a memory stick, a memory card, a removable nonvolatile memory.

32. The method according to claim 24, wherein the mark command is received via a user interface that comprises a button that when actuated sends the mark command to the processor.

33. The method according to claim 24, wherein the media player comprises a personal portable media player.

34. The method according to claim 24, wherein the computer has an electronic storage medium storing instructions which, when executed on the computer, carries out the process of conducting a transaction.

35. A method of obtaining information, comprising:
   retrieving a list of identifiers from a media player, the list of identifiers identifying tracks that have been marked for later retrieval by a user action of issuing a mark command to identify a currently playing track, the list containing at least one identifier; and
   conducting a transaction over the Internet relating to the music selection identified by the identifier.

36. The method according to claim 35, wherein the transaction is carried out with at least one service provider accessed via the Internet.

37. The method according to claim 35, wherein the transaction comprises at least one of an information query relating to the track, a financial transaction relating to the track, and a communication function relating to the track.

38. The method according to claim 35, further comprising matching the identifier with a information stored in a database.

39. The method according to claim 38, further comprising obtaining information by manual input in the event there is no match of the identifier with information stored in the database.

40. The method according to claim 35, wherein the media player plays tracks stored on a storage medium that organizes tracks using a Table Of Contents (TOC) and further comprising updating the TOC with information stored in the database.

41. The method according to claim 35, wherein the conducting further comprises:
   presenting a menu of actions available for the track identified by the identifier;
   receiving an indication of a selected action from the user; and
   conducting a transaction determined by the indication of the selected action from the user.

42. The method according to claim 35, wherein the media player plays tracks stored on a storage medium comprising one of a minidisc, a compact disc, a video disc, a magnetic disc, an optical disc, a memory stick, a memory card, and a removable nonvolatile memory.

43. The method according to claim 35, wherein the media player comprises a personal portable media player.

44. An electronic storage medium storing instructions which, when executed on the computer, carries out the method of obtaining information comprising:
   retrieving a list of identifiers from a media player, the list of identifiers identifying tracks that have been marked for later retrieval by a user action of issuing a mark command to identify a currently playing track, the list containing at least one identifier; and conducting a transaction over the Internet relating to the music selection identified by the identifier.

45. The electronic storage medium according to claim 44, wherein the transaction is carried out with at least one service provider accessed via the Internet.

46. The electronic storage medium according to claim 44, wherein the transaction comprises at least one of an information query relating to the track, a financial transaction relating to the track, and a communication function relating to the track.

47. The electronic storage medium according to claim 44, wherein the method further comprises matching the identifier with a information stored in a database.

48. The electronic storage medium according to claim 44, wherein the method further comprises obtaining information by manual input in the event there is no match of the identifier with information stored in the database.

49. The electronic storage medium according to claim 44, wherein the conducting further comprises:
   presenting a menu of actions available for the track identified by the identifier;
   receiving an indication of a selected action from the user; and
   conducting a transaction determined by the indication of the selected action from the user.

50. A method of updating a table of contents (TOC) of a recorded medium, comprising:
   retrieving a list of identifiers from a media player, the list of identifiers identifying tracks that have been marked for later retrieval by a user action of issuing a mark command to identify a currently playing track, the list containing at least one identifier;
   comparing the list of identifiers with a database to obtain further information regarding the list of identifiers; and
   updating the recorded medium's table of contents with the updated information.

51. The method according to claim 50, further comprising carrying out a transaction with at least one service provider accessed via the Internet in order to obtain further information regarding the list of identifiers.

52. The method according to claim 50, further comprising obtaining information by manual input in the event there is no match of the identifier with information stored in the database.

53. The method according to claim 50, further comprising conducting a transaction over the Internet relating to the retrieved list of identifiers comprising:
   presenting a menu of actions available for each track identified by each identifier;
   receiving an indication of a selected action from the user; and
   conducting a transaction determined by the indication of the selected action from the user.

54. A media player apparatus, comprising:
   an electronic media player that plays selections from a storage medium;
   a user interface to the electronic media player;
   a memory; and
   means, responsive to receipt of a signal from the user interface, for retrieving an identifier that identifies a selection currently playing on the electronic media player and for storing the identifier in the memory.

55. The apparatus according to claim 54, further comprising a computer interface coupled to the media player apparatus for connecting the media player apparatus to a computer.

56. The apparatus according to claim 55, wherein the identifier stored in the memory is accessible to the computer via the computer interface.

57. The apparatus according to claim 54, wherein the storage medium comprises one of a minidisc, a compact disc, a video disc, a magnetic disc, an optical disc, a memory stick, a removable memory card, and a removable nonvolatile memory.

58. The apparatus according to claim 54, wherein the user interface comprises a dedicated mark button that when actuated sends the signal.

59. The apparatus according to claim 54, wherein the user interface comprises a button that sends the signal in addition to other command signals.

60. An electronic media player apparatus, comprising:

a media player device for playback of audio content from a removable electronic storage medium;

an electronic memory; and a processor within the media player that, in response to receipt of a mark command from a user, obtains identifying information from the electronic storage medium and stores the identifying information in the electronic memory, wherein the mark command identifies a music selection that is playing at the time of receipt of the mark command.

61. The apparatus according to claim 60, wherein the identifying information comprises at least one of a minidisc identifier (MDID), a track identifier, a track name, a song identifier and a portion of a song.

62. The apparatus according to claim 60, wherein the media comprises one of a minidisc, a compact disc and a removable flash memory.

63. The apparatus according to claim 60, wherein the media comprises a minidisc and wherein the identifying information comprises a minidisc identifier and a track identifier.

64. The apparatus according to claim 60, further comprising a user interface coupled to the processor, and wherein the processor stores the identifying information in the electronic memory in response to a user input via the user interface.

65. A minidisc playback apparatus, comprising:

a minidisc player mechanism for playback of audio content from a minidisc;

an electronic memory; and a processor that obtains identifying information from the minidisc and stores the identifying information in the electronic memory in response to receipt of a mark command from a user received during playback of a track of the minidisc.

66. The apparatus according to claim 65, wherein the identifying information comprises at least one of a minidisc identifier (MDID), a track identifier, a track name, a song identifier and a portion of a song.

67. The apparatus according to claim 65, further comprising a user interface coupled to the processor, and wherein the processor stores the identifying information in the electronic memory in response to a user input via the user interface.

68. A minidisc playback apparatus, comprising:

a minidisc player mechanism for playback of audio content from a minidisc;

an electronic memory;

a user interface; and a processor that obtains identifying information from the minidisc in response to a mark command from the user interface received during playback of a track and stores the identifying information associated with the track that is playing in the electronic memory.

69. The apparatus according to claim 68, wherein the identifying information comprises at least one of a minidisc identifier (MDID), a track identifier, a track name, a song identifier and a portion of a song.

70. The apparatus according to claim 68, further comprising means for transmitting a marking list to a remote user.

* * * * *